A. ULLMANN.
NUT LOCK.
APPLICATION FILED MAY 8, 1908.
906,476.
Patented Dec. 8, 1908.
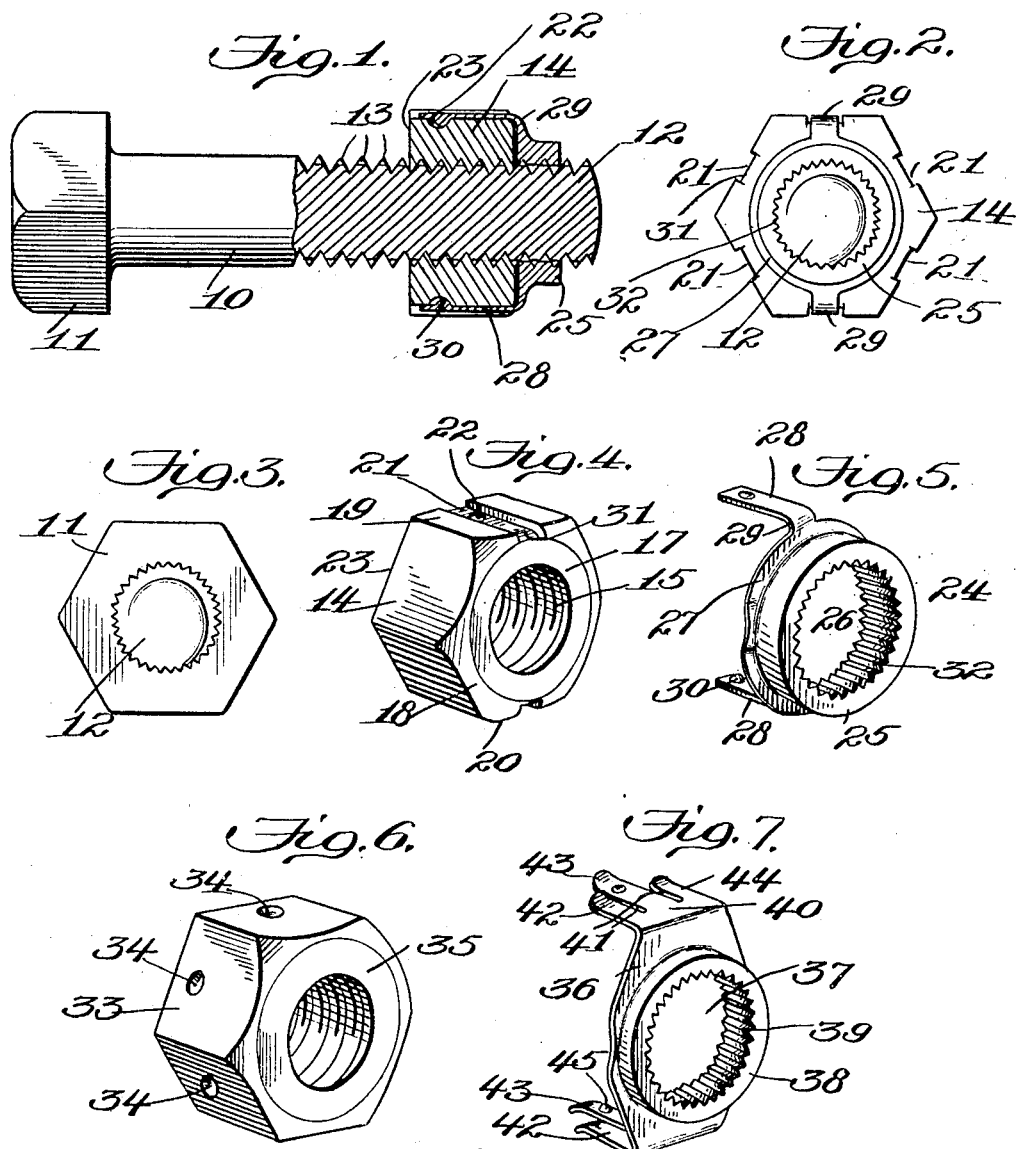
Witnesses,
Inventor
Albert Ullmann
By James L. Norris,
Atty.

UNITED STATES PATENT OFFICE.

ALBERT ULLMANN, OF MACON, GEORGIA.

NUT-LOCK.

No. 906,476.  Specification of Letters Patent.  Patented Dec. 8, 1908.

Application filed May 8, 1908. Serial No. 431,588.

*To all whom it may concern:*

Be it known that I, ALBERT ULLMANN, a citizen of the United States, residing at Macon, in the county of Bibb and State of Georgia, have invented new and useful Improvements in Nut-Locks, of which the following is a specification.

This invention relates to nut locks and one of the objects is to provide a nut lock in a manner as hereinafter set forth whereby the nut will be prevented from rotating backwardly upon the bolt and furthermore to produce a nut lock which may be inexpensively constructed, easily applied and operated, and by means of which the nut may be rotatably connected to the bolt and eventually prevented from backward rotation no matter how severe the jars and concussions will be to which the nut lock is subjected.

Further objects of the invention are to provide a nut lock in a manner as hereinafter set forth which shall be extremely simple in its construction, strong, durable, efficient in its use, readily set up, and provision made for most convenient removal when desired and without distorting its shape or possible destruction, embodying an adjustable locking washer and inexpensive to manufacture.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings:—Figure 1 is a side elevation of a nut lock in accordance with this invention. Fig. 2 is an end view thereof. Fig. 3 is an end view of the bolt. Fig. 4 is a perspective view of the nut. Fig. 5 is a perspective view of the locking washer. Fig. 6 is a perspective view of a modified form of nut. Fig. 7 is a perspective view of a modified form of locking washer, and Fig. 8 is a sectional detail, showing the manner in which the locking washer is removed.

Referring to the drawings, more particularly to Figs. 1 to 5, wherein like reference characters denote corresponding parts throughout the several views, 10 denotes a bolt, forming one of the elements of the nut lock and is provided at one end with a head 11 while at its other end it is formed with a screw-threaded cylindrical portion 12, the whirls of the threads being provided with grooves 13 extending transversely thereof. The grooves 13 of the whirls are so disposed as to extend in longitudinal alinement with respect to the axis of the bolt. The thread is V-shaped in cross section and owing to the manner in which the grooves are disposed throughout the length of the thread, the cylindrical screw-threaded portion 12 is thereby provided with a series of longitudinally extending grooves. Mounted upon the screw-threaded portion 12 of the bolt 10 is a nut 14 constituting another element of a nut lock. The nut is provided with an opening 15, the wall thereof being screw-threaded, the said threads of the wall being adapted to engage with the screw-threaded portion 12 of the bolt. The outer face 16 of the nut 14 has a smooth circular portion 17 which terminates in a rounded portion 18. The nut 14, as shown is hexagonal in contour and has two of its sides as at 19, 20 provided with a longitudinally extending groove 21, the bottom of each of which is provided with a recess 22. The grooves 21 are arranged diametrically opposite each other and the recess or pocket 22 is positioned nearer the face 23 of the nut than to the face 16. Mounted upon that portion of the bolt 10 which projects from the outer face of the nut 14 is a locking washer referred to generally by the reference character 24 and which forms the other locking element of the nut lock. The locking washer 24 comprises a body portion 25 formed with a centrally disposed opening 26 to permit of the mounting of the said body portion 25 upon the bolt 10. The body portion 25 is of greater diameter at its inner side than at its outer side, as indicated by the reference character 27 and the said enlarged portion 27 has formed integral therewith a pair of locking wings 28 arranged diametrically opposite, each of which is formed of an inturned portion 29 at its outer terminus and has projecting from its inner face near its inner terminus a lug 30 adapted to engage in a pocket 22, as clearly shown in Fig. 1. The enlarged inner side of the washer 27 abuts against the flattened portion of the face 16 and the inturned portions 29 of the wings 30 engage the rounded portions 31 formed at the outer end of the bottom wall of the grooves 21. The wings 28 are adapted to be mounted in the grooves 21, as clearly shown in Fig. 1 and by such an arrangement the nut 14 is prevented from rotating in one direction. The inner face of the body portion 25 of the locking washer is provided with an annular series of longitudinally extending teeth 32 adapted when the locking washer is mounted upon the bolt 10 to engage in the longitudinally extending grooves 13 formed in the screw-threaded portion 12 of the bolt 10 and by such an arrangement the locking washer 24 is prevented from turning upon the bolt so therefore if the nut should attempt to turn the engagement of the teeth 32 in the grooves 13 will prevent such turning movement of the nut. The wings 34 are formed of resilient material so that they will snap to engaging position with respect to the nut 14 when the lugs 30 enter the recess or pocket 22. The lugs 30 are somewhat smaller than the sides of the pockets 22 and when said lugs are in a position to connect the wings to the nut 14, the said lugs 30 bear against the forward wall of the recess or pocket 22, as clearly shown in Fig. 1.

In the modified form shown in Figs. 6 and 7, the nut which is indicated by the reference character 33 is not provided with the grooves 21 but with a pocket or recesses 34 arranged diametrically opposite each other. The outer face of the nut 33 is formed with a flattened portion 35, against which bears the locking washer. The latter consists of a body portion 36 provided with an opening 37 and the said body portion has projecting therefrom an annular offset 38 which has its inner face provided with a series of teeth 39 arranged in an annular manner and the said teeth extending longitudinally with respect to the axis of the bolt upon which the locking washer is mounted. The body portion 36 of the locking washer at each end terminates in a slitted wing 40, the slits of the wing being indicated by the reference character 41 and providing the tongues 42, 43 and 44. The tongue 43 is arranged centrally of the wing and is of greater length than either of the tongues 42, 44. Each of the tongues 43 is provided with a lug 45 in its free end which is adapted when the locking washer is in position to engage in the pocket or recess 34 whereby the locking washer is fixed in position.

In Fig. 8 of the drawings 46 denotes a tool adapted to engage the inner face of the locking washer which is indicated by the reference character 47 whereby the said washer can be readily disconnected from the nut 48. The bolt is indicated by the reference character 49. By bringing the sections of the tool 46 towards each other it will cause the removing of the wings of the locking washer or in other words the removal of the lugs of the wings of the locking washer out of the recess or pockets formed in the bolts.

By either of the constructions set up a minute adjustment of the nut can be had without embodying in any manner the function of the locking washer. This minute adjustment of the nut is had owing to the providing of longitudinally extending teeth throughout the inner face of the locking washer. By the construction set forth the washer can be adjusted relative to the position of the nut which obviates the necessity of turning backward the nut when it is desired to adjust the locking washer.

It is evident that a nut lock in accordance with this invention is very simple in its construction and can be applied to all the various forms and sizes of bolts and nuts and may be employed for all purposes requiring the application of a locking attachment to the nut. By providing the locking washer with the wings and lugs, the washer is not only held from longitudinal movement, but also prevents the washer from dropping off the bolt and when the lugs of the wings of the washer are in engagement with the nut, the latter is prevented from back rotation as the teeth of the washer engage with the threads of the bolt. By providing the slitted wings 40, each wing 40, as before stated, is divided into three tongues, one of which is formed with a lug engaging in a pocket or recess 34. The slitted wing construction is provided so that in case of any possible twist or attempt at rotation of the nut, the motion thus caused is only conveyed to the two outer tongues of the wing, leaving the center part or the locking tongue undisturbed. This same function is obtained with the channeled nut, as the sides of the channels or grooves prevent shifting of the wing. The grooves or channels 21 can be placed on all sides of the nut and the same is true of the pockets or recesses 22. In Fig. 6 the nut is shown as having all of its sides formed with a pocket to receive the lug or protuberance of the wing.

What I claim is:—

1. A nut lock comprising a bolt having a screw-threaded portion with the whirls of the thread provided with grooves extending in parallelism with respect to the axis of the bolt, said grooves being so disposed as to provide the screw-threaded portion of the bolt with a series of longitudinally extending channels, a nut mounted upon said screw-threaded portion and provided with a pair of pockets arranged diametrically opposite each other, a locking washer mounted against the outer face of the nut and having its inner face formed with longitudinally extending teeth adapted to engage in the channels of the bolt whereby said washer is capable of frictional adjustment around the bolt with respect to the position of the nut, said washer further provided with a pair of resilient retaining wings each of which is provided with a lug adapted to engage in one of the pockets whereby said washer is prevented from longitudinally shifting upon the bolt, the teeth of said washer preventing the turning of the washer upon the bolt and said lugs in connection with the walls of said pockets preventing the turning of the nut upon the bolt.

2. A nut lock comprising a bolt having the screw-threaded portion provided with a circumferentially extending series of longitudinal grooves, said grooves arranged in close proximity to each other, a nut mounted upon said screw-threaded portion and provided with a pair of pockets, and a locking washer mounted upon the bolt and having its inner face formed with a series of longitudinally extending teeth arranged in close proximity to each other and adapted to engage in the grooves of the bolt, the grooves of said bolt and the teeth of said washer so disposed as to provide for minute fractional adjustment of the washer with respect to the nut, said washer furthermore provided with a pair of resilient wings each provided with a lug adapted to engage in a pocket whereby said washer is prevented from longitudinal shifting upon the bolt and said nut is prevented from backward rotation.

3. A nut lock comprising a bolt having a screw-threaded portion with the whirls of the thread provided with grooves extending in parallelism with respect to the axis of the bolt, said grooves being so disposed as to provide the screw-threaded portion of the bolt with a series of longitudinally extending channels, a nut mounted upon said screw-threaded portion and provided with a pair of pockets arranged diametrically opposite each other, a locking washer mounted against the outer face of the nut and having its inner face formed with longitudinally extending teeth adapted to engage in the channels of the bolt whereby said washer is capable of fractional adjustment around the bolt with respect to the position of the nut, said washer further provided with a pair of resilient retaining wings each of which is provided with a lug adapted to engage in one of the pockets whereby said washer is prevented from longitudinally shifting upon the bolt, the teeth of said washer preventing the turning of the washer upon the bolt and said lugs in connection with the walls of said pockets preventing the turning of the nut upon the bolt, each of said retaining wings slitted to provide each of said wings with a series of tongues.

4. A nut lock comprising a bolt having a screw-threaded portion provided with circumferentially extending series of longitudinal grooves, said grooves arranged in close proximity to each other, a nut mounted upon said screw-threaded portion and provided with a plurality of pockets, and a locking washer mounted upon the bolt and having its face provided with a series of longitudinally extending teeth arranged in close proximity to each other and adapted to engage in the grooves of the bolt, the grooves of said bolt and the teeth of said washer so disposed as to provide for a minute fractional adjustment around the bolt with respect to the position of the nut and said washer furthermore provided with a pair of resilient wings, each of said wings being slitted to form a series of tongues, the intermediate tongue of each series provided with a lug adapted to engage in a pocket whereby said washer is prevented from longitudinal shifting upon the bolt and said nut is prevented from backward rotation, the outer tongues of said series of tongues providing means to prevent the displacement of the intermediate tongue if the nut should shift.

In testimony whereof I have hereunto set my hand in presence of two subscribing witnesses.

ALBERT ULLMANN.

Witnesses:
HENRY R. HUHN,
OSCAR H. GEIGER.